(12) United States Patent
Åström et al.

(10) Patent No.: US 11,570,725 B2
(45) Date of Patent: Jan. 31, 2023

(54) METHOD AND NETWORK NODE FOR ENABLING WIRELESS COMMUNICATION WITH A WIRELESS DEVICE

(71) Applicant: Telefonaktiebolaget LM Ericsson (publ), Stockholm (SE)

(72) Inventors: Magnus Åström, Lund (SE); Bo Hagerman, Jersey City, NJ (US); Bengt Lindoff, Bjärred (SE); Fredrik Nordström, Lund (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 62 days.

(21) Appl. No.: 16/469,765

(22) PCT Filed: Dec. 22, 2016

(86) PCT No.: PCT/SE2016/051314
§ 371 (c)(1),
(2) Date: Jun. 14, 2019

(87) PCT Pub. No.: WO2018/117922
PCT Pub. Date: Jun. 28, 2018

(65) Prior Publication Data
US 2020/0092831 A1   Mar. 19, 2020

(51) Int. Cl.
*H04W 52/36* (2009.01)
*H04L 5/00* (2006.01)
(Continued)

(52) U.S. Cl.
CPC ......... *H04W 52/367* (2013.01); *H04L 5/0007* (2013.01); *H04L 5/0048* (2013.01);
(Continued)

(58) Field of Classification Search
CPC .............. H04L 27/2601; H04L 5/0007; H04L 5/0048; H04L 5/0053; H04W 52/143;
(Continued)

(56) References Cited

U.S. PATENT DOCUMENTS

| 9,391,745 | B2 | 7/2016 | Agee et al. | |
|---|---|---|---|---|
| 2009/0225701 | A1* | 9/2009 | Kwon | H04L 1/0006 370/328 |
| 2010/0035653 | A1 | 2/2010 | Chang et al. | |
| 2012/0196611 | A1* | 8/2012 | Venkatraman | H04W 52/143 455/562.1 |
| 2014/0086072 | A1 | 3/2014 | Maaref et al. | |

OTHER PUBLICATIONS

Nitin et al. Applicant supplied IDS—NPL: NB-IoT Deployment Study for Low Power Wide Area Cellular IoT: 2016 IEEE 27th Annual International Symposium on Personal, Indoor, and Mobile Radio Communications (PIMRC)—Workshop: From M2M Communications to Internet of Things (Year: 2016).*
(Continued)

*Primary Examiner* — Kibrom T Hailu
*Assistant Examiner* — Nizam U Ahmed
(74) *Attorney, Agent, or Firm* — Baker Botts, LLP (57) ABSTRACT

A method and a network node (300) for enabling wireless communication with a wireless device (302), wherein no more than a pre-determined maximum total transmit power is available for downlink transmission by the network node (300). When detecting that the wireless device (302) requires an extended transmission range (300B) which is larger than a nominal transmission range (300A), a boosted transmit power is determined and used for transmitting a first set of channels and/or signals to be used by the wireless device (302) to achieve the extended transmission range (300B). An attenuated transmit power is also determined and used for transmitting a second set of channels and/or signals not included in the first set of channels and/or signals, which provides a slightly reduced transmission range (300C) for
(Continued)

the second set. The boosted transmit power is thus higher than a nominal transmit power, and the attenuated transmit power is lower than the nominal transmit power, so that the total transmit power used for transmitting said first and second sets does not exceed the pre-determined maximum total transmit power.

20 Claims, 6 Drawing Sheets

(51) Int. Cl.
    *H04W 52/14*     (2009.01)
    *H04W 52/26*     (2009.01)
    *H04W 52/32*     (2009.01)
    *H04W 72/04*     (2009.01)

(52) U.S. Cl.
    CPC ....... *H04W 52/143* (2013.01); *H04W 52/267* (2013.01); *H04W 52/322* (2013.01); *H04W 72/042* (2013.01)

(58) Field of Classification Search
    CPC ............... H04W 52/16; H04W 52/245; H04W 52/262; H04W 52/267; H04W 52/283; H04W 52/322; H04W 52/367; H04W 72/042
    USPC .......................................................... 370/330
    See application file for complete search history.

(56) References Cited

OTHER PUBLICATIONS

Office Action from Intellectual Property Patent Office India in Application No. 201917023520, dated Jan. 29, 2021, 6 pages (translated).

EPO Examination Report in EP Application No. 16 825 599.01-1205, dated Feb. 5, 2021, 8 pages.

"The impact of PSD boosting on applicable channels," Huawei, HiSilicon, 3GPPTSG RAN WGI Meeting #74, RI-132882, Aug. 19-23, 2013, 3 pages.

NB—IoT Deployment Study for Low Power Wide Area Cellular IoT by Nitin Mangalvedhe et al.; 2016 IEEE 27th Annual International Symposium on Personal, Indoor, and Mobile Radio Communications (PIMRC)—Workshop: From M2M Communications to Internet of Things—2016.

PCT International Search Report for International application No. PCT/SE2016/051314—Aug. 1, 2017.

PCT Written Opinion of the International Searching Authority for International application No. PCT/SE2016/051314—Aug. 1, 2017.

Communication Pursuant to Article 94(3) EPC issued for Application No. 16 825 599.0-1205—dated Jun. 19, 2020.

3GPP TSG RAN WG1 meeting #60; San Francisco, USA; Source: Huawei; Title: CSI-RS design to support multiple-cell measurement (R1-101058)—Feb. 22-26, 2010.

3GPP TSG RAN1#72; St. Julian's, Malta; Source: Nokia Siemens Networks, Nokia; Title: Coverage Improvement Performance Results for NTC UEs (R1-130489)—Jan. 28-Feb. 1, 2013.

\* cited by examiner

Fig. 9

METHOD AND NETWORK NODE FOR ENABLING WIRELESS COMMUNICATION WITH A WIRELESS DEVICE

PRIORITY

This nonprovisional application is a U.S. National Stage Filing under 35 U.S.C. § 371 of international Patent Application Ser. No. PCT/SE2016/051314 filed Dec. 22, 2016 and entitled "Method and Network Node for Enabling Wireless Communication with a Wireless Device" which is hereby incorporated by reference in its entirety.

TECHNICAL FIELD

The present disclosure relates generally to a method and a network node, for enabling wireless communication with a wireless device when a pre-determined maximum total transmit power is available for downlink transmission by the network node.

BACKGROUND

In a wireless network comprising a plurality of network nodes, it is desirable to utilize available radio resources and network equipment as efficiently as possible so as to achieve high capacity and adequate performance in communication with wireless devices. The term "wireless network" is used in this description to denote any network comprising network nodes, such as base stations, access points, eNodeBs or the like, which are capable of radio communication with wireless devices, e.g. by transmitting channels and/or signals in subcarriers, resource blocks, resource elements, distributed across an available total frequency bandwidth.

The nodes in the wireless network that perform such radio communication with wireless devices are also generally denoted "network nodes" herein. Further, the term "wireless device" denotes any communication equipment that is capable of radio communication with network nodes in a wireless network. Some non-limiting examples of wireless devices that may be involved in the procedures described herein include mobile phones, smartphones, tablets, laptop computers and Machine-to-Machine, M2M, devices. Throughout this description, the term "User Equipment", UE, may be used instead of wireless device.

In a wireless network operating according to Long Term Evolution, LTE, as defined by the third Generation Partnership Project, 3GPP, signals are transmitted by the network nodes using Orthogonal Frequency-Division Multiplexing, OFDM, which is a method of encoding digital data on multiple carrier frequencies. For downlink transmission, various channels and/or signals can be organized in a resource block. The resource blocks are used for carrying various data and control information and also reference signals which can be used e.g. for various measurements and channel estimation. The term "resource block" is used herein as a generic term to represent a set of resource elements in which reference signals, user data and/or control data can be transmitted from a network node, regardless of how the resource elements are organized or arranged in the resource block. Further, resource elements in LTE are typically organized in a so-called "resource block pair" of 1 ms duration where a single resource block is defined with a duration of 0.5 ms. A resource block as described herein may in some examples be such a resource block pair as defined in LTE, although this description is not limited to the LTE definition of a resource block. Further, a Resource Element Group is a limited group of adjacent Resource Elements, REs, that are located in the control region of a resource block. A Resource Element Group may e.g. include 4-6 REs.

Figure 1:
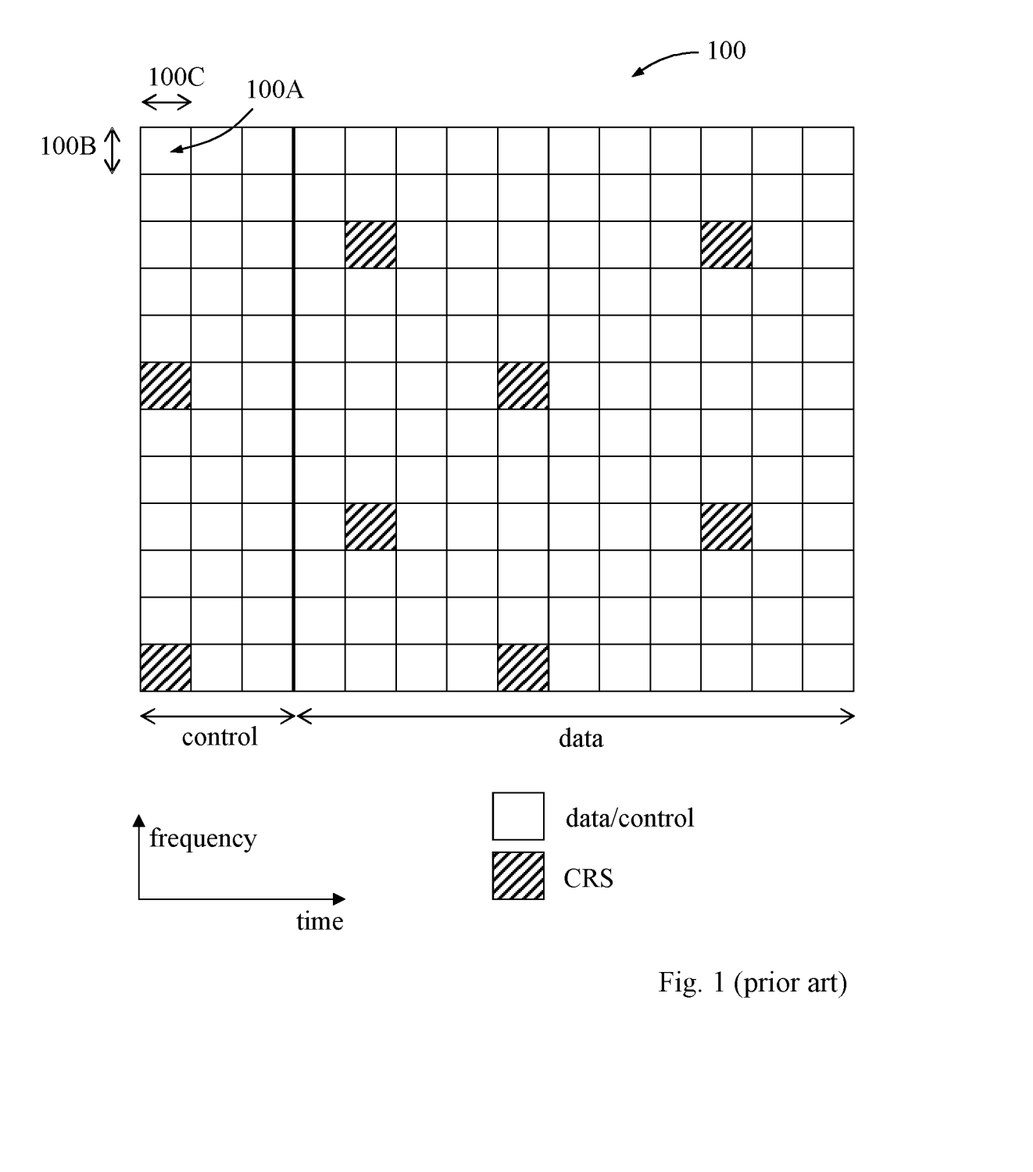
FIG. 1 illustrates an example downlink resource block or resource block pair with resource elements used for reference signals in predefined positions, according to the prior art.

An example of how a resource block may be configured is illustrated in FIG. 1. A downlink transmission may comprise multiple parallel resource blocks which can be arranged in the frequency domain as distributed in a "stacked" manner across an available frequency bandwidth. In other words, the total available frequency bandwidth can be divided into a set of resource blocks which are thus separated in the frequency domain. One resource block 100, or resource block pair if using the LTE terminology, may extend over 180 kHz during 1 millisecond, ms. The resource block 100 can for example be further divided into 12 subcarriers in the frequency domain and into 14 OFDM symbols in the time domain, as shown in FIG. 1. The resource block 100 in FIG. 1 is thus effectively a "resource grid" divided into 12 elements in the frequency domain representing the subcarriers and 14 elements in the time domain representing the OFDM symbols.

In this example, the smallest resource in the resource block 100 is comprised of one Resource Element, RE, 100A which corresponds to the spectrum allocated for one subcarrier 100B during one OFDM symbol 100C. The resource block 100 in this example is thus comprised of 12×14 REs. The first 1 to 3 OFDM symbols may compose the control region where mainly the Physical Downlink Control Channel, PDCCH, can be multiplexed. The rest of the OFDM symbols in the resource block 100 may compose the data region where mainly the Physical Downlink Shared Channel, PDSCH, can be multiplexed.

Some predefined resource elements in preset positions in this time/frequency grid can be used for transmitting CRSs which are indicated in FIG. 1 as striped resource elements, while the resource elements used for user data and control data are shown to be non-striped. A predetermined sequence of CRSs thus occur in predefined RE positions which are known to the wireless devices. The CRSs can be used by the wireless devices for synchronization, channel estimation, determination of a Channel Quality Indicator, CQI, a Rank Indicator, RI and a Precoding Matrix Indicator, PMI, as well as for mobility measurements such as measuring Reference Signal Received Power, RSRP, and Reference Signal Received Quality, RSRQ, etc.

Since reference signals such as CRSs are used for cell or mobility measurements by wireless devices in idle mode which are more or less unknown to the network, the reference signals for mobility measurements effectively determine the coverage of a cell served by the network node. The wireless devices also need to receive synchronization signals, e.g. including a Primary Synchronization Signal PSS and a Secondary Synchronization Signal SSS, in order to connect to a cell and be able to receive and read various cell and system information in control channels broadcasted by the network node. In other words, the cell effectively extends as far as the synchronization signals, reference signals and cell and system information can be detected and used by a wireless device.

However, it is a problem that a certain limited amount of transmit power is typically available in the network node which may not be sufficient to provide the transmission range wanted for the cell. The total maximum transmit power available in the network node may be determined by existing equipment such as a power amplifier having a certain capacity.

Figure 2A:
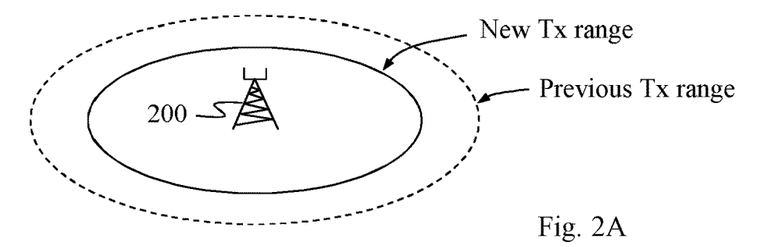
FIGS. 2A-B illustrate how transmission range may be reduced when upgrading network nodes by introducing new radio access technology.
Figure 2B:
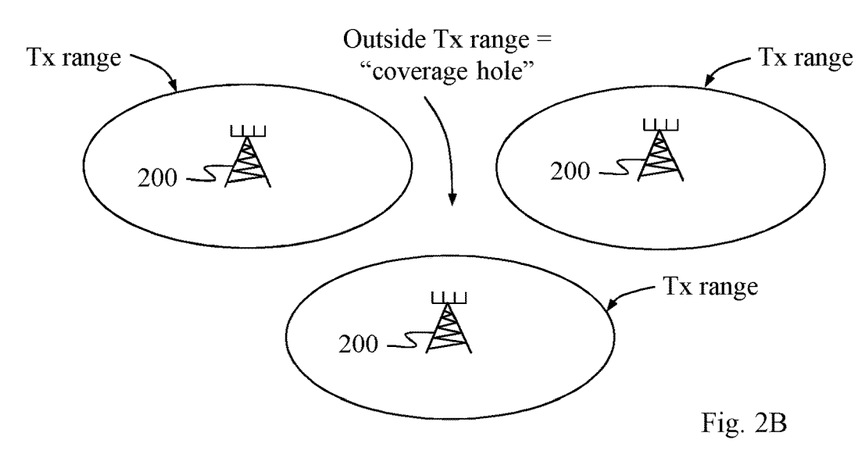

When a network node is upgraded by employing new radio access technologies such as more advanced modulation and coding schemes MCSs, higher capacity and bitrates may be achieved although the communications may at the same time be more vulnerable to radio disturbances such as fading, noise and interference. This may result in shorter transmission range where a satisfactory signal quality can be achieved at a receiving wireless device, as illustrated in FIG. 2A where a new transmission, Tx, range is smaller than a previous Tx range that was achieved when using a more robust technology. As a result, cells of such upgraded network nodes may give rise to areas that lie outside their transmission range and which areas were previously covered by the previous Tx range, as illustrated in FIG. 2B where such an area is denoted "coverage hole". Furthermore, the transmit power that can be used for each transmitted downlink channel and signal may be limited depending on the available total maximum transmit power which must be sufficient for transmitting all channels and/or signals.

It may be possible to extend the coverage of the cell, or maintain the coverage when new radio access technologies are introduced, by installing a new power amplifier with higher capacity and/or by reconfiguring or "retuning" certain mobility parameters, sometimes referred to as Radio Resource Management, RRM, parameters. However, such solutions are quite expensive to employ for each network node, especially when a great number of network nodes need to be upgraded and/or reconfigured in the wireless network.

SUMMARY

It is an object of embodiments described herein to address at least some of the problems and issues outlined above. It is possible to achieve this object and others by using a method and a network node as defined in the attached independent claims.

According to one aspect, a method is performed by a network node of a wireless network, for enabling wireless communication with a wireless device, wherein a pre-determined maximum total transmit power is available for downlink transmission by the network node. In this method the network node detects that the wireless device requires an extended transmission range which is larger than a current transmission range provided by the network node when using a nominal transmit power. The network node then identifies a first set of channels and/or signals to be used for said wireless communication with the wireless device.

The network node further determines a boosted transmit power for the first set of channels and/or signals required to achieve the extended transmission range, the boosted transmit power being higher than the nominal transmit power. The network node also determines an attenuated transmit power for a second set of channels and/or signals not included in the first set of channels and/or signals, the attenuated transmit power being lower than the nominal transmit power. Finally, the network node transmits the first set of channels and/or signals using the boosted transmit power and the second set of channels and/or signals using the attenuated transmit power, so that the total transmit power used for transmitting said first and second sets does not exceed the pre-determined maximum total transmit power.

According to another aspect, a network node is arranged or configured to enable wireless communication with a wireless device in a wireless network, wherein a pre-determined maximum total transmit power is available for downlink transmission by the network node. The network node is configured to detect that the wireless device requires an extended transmission range which is larger than a current transmission range provided by the network node when using a nominal transmit power, and to identify a first set of channels and/or signals to be used for said wireless communication with the wireless device.

The network node is further configured to determine a boosted transmit power for the first set of channels and/or signals required to achieve the extended transmission range, the boosted transmit power being higher than the nominal transmit power, and to determine an attenuated transmit power for a second set of channels and/or signals not included in the first set of channels and/or signals, the attenuated transmit power being lower than the nominal transmit power. The network node is also configured to transmit the first set of channels and/or signals using the boosted transmit power and the second set of channels and/or signals using the attenuated transmit power, so that the total transmit power used for transmitting said first and second sets does not exceed the pre-determined maximum total transmit power.

An advantage that may be achieved by the above method and network node is that the wireless device is able to properly receive the first set of channels and/or signals while the pre-determined maximum total transmit power is not exceeded, thanks to the boosting of the first set and the attenuation of the second set which effectively compensates for the boosted first set. Another advantage is that the extended transmission range can be achieved for the wireless device without requiring any costly modifications of hardware equipment or reconfigurations of mobility parameters such as RRM parameters. The advantage of avoiding such modifications and reconfigurations may be substantial specifically when a great number of network nodes would have to be upgraded and/or reconfigured in the wireless network.

The above method and network node may be configured and implemented according to different optional embodiments to accomplish further features and benefits, to be described below.

A computer program is also provided which comprises instructions which, when executed on at least one processor, cause the at least one processor to carry out the method described above. A carrier containing the above computer program is further provided, wherein the carrier is one of an electronic signal, an optical signal, a radio signal, or a computer readable storage medium.

BRIEF DESCRIPTION OF DRAWINGS

The solution will now be described in more detail by means of exemplary embodiments and with reference to the accompanying drawings, in which.

DETAILED DESCRIPTION

Briefly described, a solution is provided in a network node to enable wireless communication with a wireless device when the wireless device is located outside a current transmission range achieved by using a nominal transmit power at the network node. In this disclosure, the term "nominal transmit power" is defined as the transmit power that can be used for transmitting each RB uniformly across the entire frequency bandwidth when using all the available pre-determined maximum total transmit power. In this solution, it has been recognized that a wireless device that is located outside the current transmission range can continue being served by the network node if the current transmission range can be extended for the wireless device while still using a total transmit power in the cell that does not exceed the available pre-determined maximum total transmit power.

Figure 3:
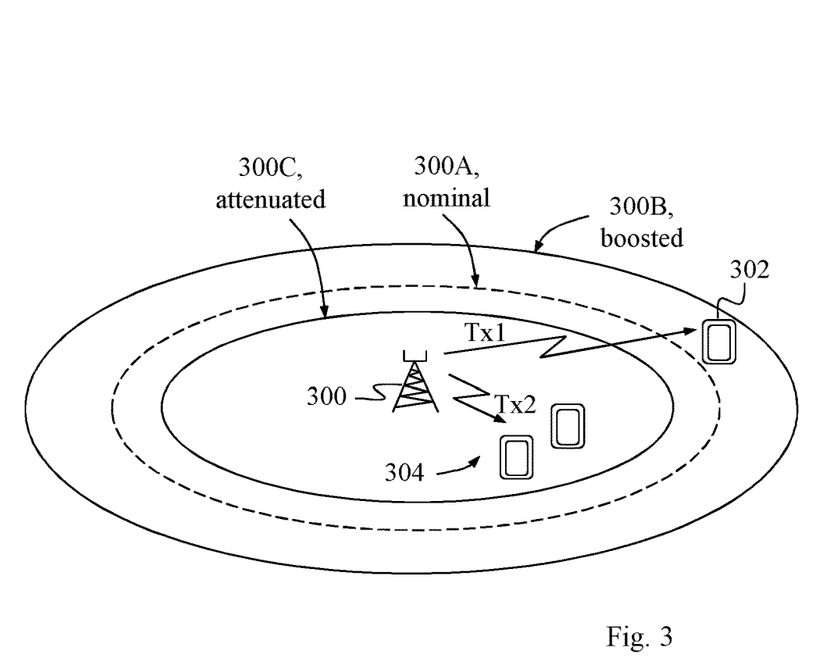
FIG. 3 is a communication scenario illustrating an example of how the solution may be employed, according to some possible embodiments.

This may be achieved by transmitting different channels and/or signals in resource blocks, on subcarriers and/or in resource elements using differentiated transmit power, so that the wireless device can be served properly with channels and/or signals that are boosted by using an increased transmit power to reach the device, basically as illustrated in FIG. 3. In this example, a network node 300 is serving a "remote" wireless device 302 that is located relatively far from the network node 300 i.e. outside the current transmission range that would be covered by the network node 300 by using the above-described nominal transmit power, as illustrated by a dashed line 300A. The network node 300 is also serving other wireless devices 304 that are located closer to the network node 300, i.e. within the current transmission range. In this disclosure the term "current transmission range", or alternatively "nominal transmission range", thus implies the coverage area achieved when using the nominal transmit power.

The term "radio resource" is used herein to represent any of: a resource block, a resource block group, a frequency interval or subframe, a resource element and a resource element group. In order to serve the wireless device 302 properly, the transmit power Tx1 for those radio resources, e.g. resource blocks, subcarriers and/or resource elements, that carry channels and/or signals to be used for the wireless device 302 is boosted relative the nominal transmit power, while the transmit power Tx2 for other channels and/or signals to be used for other wireless devices 304 not requiring any extended transmission range can be slightly attenuated relative the nominal transmit power to compensate for the power boost of Tx1. Thereby, it is possible to provide an extended transmission range for the wireless device 302, as indicated by numeral 300B, while keeping the total transmit power used within the pre-determined maximum total transmit power which can be seen as a limited available "power budget". As a result, the transmission range will be slightly reduced for the other channels and/or signals by using the attenuated transmit power Tx2.

The boosted transmit power Tx1 of the channels and/or signals for the wireless device 302 may further be used only in a specific direction towards the wireless device 302, if applicable, while the transmit power of those channels and/or signals can be lower or even muted in other directions. The above may also be applied when the network node is capable of transmission in limited sectors such as beam-forming, although the solution is not limited thereto.

The channels and/or signals to be used by the wireless device 302 may include channels and/or signals dedicated to the wireless device and also common channels and/or signals that any wireless device needs to receive in order to detect and connect to the cell. The term "common channels and/or signals" implies that they can be used by any wireless device, typically for cell attachment and idle mode operations, while dedicated channels and/or signals are needed for device-specific communications such as when the wireless device 302 needs to communicate with the network. The common channels and/or signals are thus used by the idle wireless device for monitoring a cell and reading system information, and the dedicated channels and/or signals are chiefly related to and carry paging and scheduling of the wireless device on different radio resources, and so forth. Examples of such common and dedicated channels and/or signals will be described in more detail below.

Figure 4:
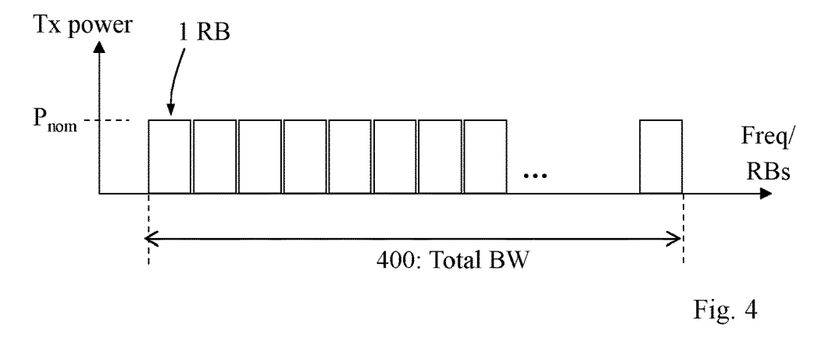
FIG. 4 illustrates an example of how resource blocks across an available frequency bandwidth are transmitted with uniform transmit power in a conventional manner.

FIG. 4 illustrates that a set of resource blocks, RBs, are distributed across a total frequency bandwidth 400 that is available for downlink transmissions by the network node 300 in FIG. 3. Each RB is typically transmitted on a corresponding subcarrier, and in conventional procedures all RBs are transmitted using the same transmit power which is thus referred to herein as the nominal transmit power $P_{nom}$. This transmission provides the so-called current transmission range 300A achieved when the network node uses the nominal transmit power across the entire frequency bandwidth 400, as shown in FIG. 4. When transmitting RBs with the nominal transmit power uniformly in this way, it is assumed that all the available pre-determined maximum total transmit power must be used. However, this would only provide the coverage area 300A shown in FIG. 3 which does not include the wireless device 302, as explained above.

Figure 5:
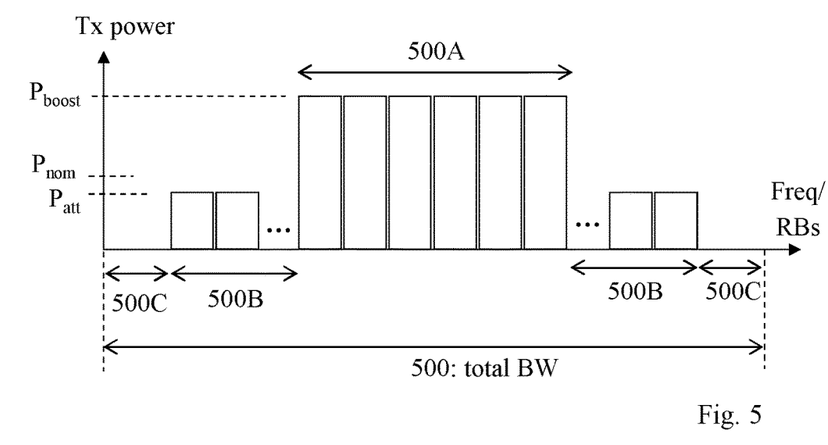
FIG. 5 illustrates an example of how resource blocks across an available frequency bandwidth may be transmitted with differentiated transmit power, according to further possible embodiments.

It was further mentioned above that it is possible to serve a remote wireless device 302 properly by boosting transmission of those channels and/or signals that will potentially be used by the wireless device 302, relative the nominal transmit power. FIG. 5 illustrates that within the total frequency bandwidth 500 for downlink transmissions, instead of conventionally using the nominal transmit power uniformly for all RBs as in FIG. 4, the network node 300 transmits different sets of RBs using different transmit power as follows, with further reference to FIG. 3.

The transmit power is boosted for a first set of channels and/or signals to be used by the wireless device 302, thereby achieving the extended transmission range 300B for the wireless device 302 exclusively, also shown in FIG. 3. The first set of channels and/or signals may be transmitted on a group of RBs, one or more RE groups or one or more REs, that may be adjacent or non-adjacent to each other. In the example of FIG. 5, the boosted first set of channels and/or signals is transmitted on a limited range or interval of RBs 500A centrally located in the total frequency bandwidth 500. Since the available pre-determined maximum total transmit power is required for using the nominal transmit power $P_{nom}$ for all RBs, the boosted transmit power for the first set of channels and/or signals, denoted $P_{boost}$, is compensated by attenuating the transmit power used for transmitting a second set of channels and/or signals not included in the first set. The attenuated transmit power for the second set of channels and/or signals, denoted $P_{att}$, is thus lower than the nominal transmit power $P_{nom}$, as shown in FIG. 5.

The attenuated transmit power $P_{att}$ may be used for transmitting other channels and/or signals for other wireless devices 304 that can tolerate a slightly reduced transmission range 300C, e.g. by being sufficiently close to the network node 300. In the example of FIG. 5, the attenuated second set of channels and/or signals is transmitted on two ranges or intervals of RBs 500B located on either side of the central RBs 500A carrying the first set of channels and/or signals. In this example, the transmission power is further set to zero for two ranges or intervals of RBs 500C which are located outside the respective ranges or intervals RBs 500B, in the manner shown in FIG. 5. The RBs in 500C are thus muted. This way there will be further power left in the power budget allowing for boosting the first set 500A.

Thereby, $P_{boost}$ and $P_{att}$ can be determined so that the available pre-determined maximum total transmit power will be sufficient for all transmissions, i.e. $P_{boost}$ and $P_{att}$ are determined so that the total transmit power used for transmitting the first and second sets does not exceed the available pre-determined maximum total transmit power according to the given power budget. FIG. 5 illustrates that transmit power is distributed in a symmetrical manner across the total frequency bandwidth 500, although depending on how the signals and channels are allocated any other distribution of transmit power, e.g. non-symmetrical, may be used when implementing the embodiments herein.

Further, it can be understood that the determination of $P_{boost}$ and $P_{att}$ may be dependent on the amount of radio resources used for the first and second sets of channels and/or signals, respectively, e.g. in terms of resource blocks, subcarriers, resource elements or resource element groups. It follows that the fewer radio resources used for the first set, the higher $P_{boost}$ can be used for the first set such that the difference between $P_{boost}$ and $P_{nom}$ would be significantly larger than the difference between $P_{att}$ and $P_{nom}$, which is also illustrated in FIG. 5 where the number of RBs used for the first set 500A is significantly lower than the number of RBs used for the second set in 500B and also including the muted RBs in 500C.

In the example of FIG. 5, the transmit power is determined per RB, although it can be understood that the transmit power could also be determined in terms of other definitions or divisions of radio resources, e.g. per frequency interval or subframe, or per resource element or resource element group within a resource block. The boosted transmit power $P_{boost}$ and possibly also the attenuated transmit power $P_{att}$ may even be determined individually per channel or signal, meaning that different channels/signals can be transmitted with different power levels even within an RB or subcarrier.

An example will now be described, with reference to the flow chart in FIG. 6, of how the solution may be employed in terms of actions which may be performed by a network node such as the above-described network node 300. Some optional example embodiments that could be used in this procedure will also be described. Reference will also be made, without limiting the described features and embodiments, to the example scenario shown in FIG. 3 and to the example power distribution in FIG. 5, where applicable. The network node 500 in this procedure is arranged to enable wireless communication with a wireless device 302, wherein a pre-determined maximum total transmit power is available for downlink transmission by the network node 300. The pre-determined maximum total transmit power may be dependent on the capacity of a power amplifier or limitations of other equipment involved in the downlink transmission by the network node 300.

A first action 600 illustrates that the network node 300 detects that the wireless device 302 requires an extended transmission range which is larger than a current transmission range provided by the network node 300 when using a nominal transmit power. The term nominal transmit power has been defined above as the power used for transmitting each RB or subcarrier when using all the available maximum total transmit power. For example, the wireless device 302 may be detected when connected to the network node 300 and moving away from the network node 300, e.g. by detecting that its transmissions are getting weaker and/or more delayed. In another example, the wireless device 302 may be detected when a neighboring network node signals a forthcoming handover of the device 302 to the network node 300 which means that it is likely located somewhere between the two network nodes, or that the neighboring network node needs to be offloaded by reducing their traffic.

In a following action 602, the network node 300 identifies a first set of channels and/or signals to be used for said wireless communication with the wireless device 302. It was mentioned above that the wireless device 302 typically needs to receive both dedicated and common channels and signals, e.g. depending on how it will operate, and some examples of such channels and signals will be described below.

In a further action 604, the network node 300 determines a boosted transmit power $P_{boost}$ for the first set of channels and/or signals required to achieve the extended transmission range, the boosted transmit power $P_{boost}$ being higher than the nominal transmit power $P_{nom}$. Such a boosted transmit power was explained above and illustrated in FIG. 5. For example, $P_{boost}$ may be determined to be a predefined "default" value which provides a predefined extended transmission range or coverage. Alternatively, $P_{boost}$ may be determined based on an estimated location of the wireless device 302 which in turn may be determined based on a measured received signal strength and/or a measured received signal delay, or based on the device's location obtained by means of a Global Positioning System, GPS, function or other positioning function.

In another action 606, the network node 300 also determines an attenuated transmit power $P_{att}$ for a second set of channels and/or signals not included in the first set of channels and/or signals, the attenuated transmit power $P_{att}$ being lower than the nominal transmit power $P_{nom}$. For example, $P_{att}$ may be determined as the remaining available transmit power according to the above-described power budget of the pre-determined maximum total transmit power. Alternatively, $P_{att}$ may be determined based on the presence of any further wireless devices in the cell and their need of receiving channels and/or signals.

Having determined $P_{boost}$ and $P_{att}$ an action 608 illustrates that the network node 300 accordingly transmits the first set of channels and/or signals using the boosted transmit power, and another action 610 illustrates that the network node 300 also transmits the second set of channels and/or signals using the attenuated transmit power, so that the total transmit power used for transmitting said first and second sets does not exceed the pre-determined maximum total transmit power. Actions 608 and 610 may be performed in parallel, i.e. more or less at the same time. Thereby, it is an advantage that the wireless device 302 is able to properly receive the first set of channels and/or signals while the pre-determined maximum total transmit power is not exceeded, thanks to the boosting of the first set and the attenuation of the second set which effectively compensates for the boosted first set.

It was mentioned above that a wireless device typically needs to receive common channels and signals for monitoring a cell and read system information, and further receive various dedicated channels and/or signals in order to execute a communication e.g. for paging and for transmitting and/or receiving data. A non-limiting example of how a wireless device may need to receive and use various channels and signals for different purposes will now be described in more detail.

Initial Access

In order to associate to a wireless network, the wireless device first needs to find a cell, perform a time and frequency synchronization and read system information. In LTE this is done by performing the following operations in the wireless device:
1. Detect the Primary Sync Signal PSS, whereby the wireless device's Local Oscillator LO is adjusted to the transmission frequency of the serving network node, to obtain timing on a symbol level.
2. Detect the Secondary Sync Signal SSS, providing Cell identity and frame timing.
3. Decode Physical Broadcast Channel PBCH, providing the Master Information Block (MIB) data containing information such as cell DL bandwidth, Physical Hybrid-ARQ Indicator Channel PHICH and/or Physical Control Format Indicator Channel PCFICH configuration (allowing the PDCCH to be read) and System Frame Number SFN.
4. Decode PDCCH in order to determine which PDSCH RBs contain SIB information.
5. Decode PDSCH RBs containing SIB information which may include cell operator, UL bandwidth and power control and random access information.

Random Access

The above Initial Access was performed to obtain various information about the network. In order for the network to know about the wireless device it needs to perform a Random Access. Random access is performed by the following operations in the wireless device:
1. Transmit a Random Access Preamble on the Physical Random Access Channel PRACH using info in SIB-2, allowing the network node to estimate timing of the wireless device.
2. Receive a Random Access Response on the PDSCH instructing the wireless device to modify its UL timing, receive TC-RNTI ID, and receive UL resources for the next operation 3.
3. Transmit UE identity on the PUSCH.
4. Receive ACK/NACK on the PHICH for the UE identity transmission.
5. Receive Contention Resolve Message on the PDSCH, in case multiple wireless devices use same PRACH resource.

Paging

Paging is used by the network to set the wireless device in active mode. This is done by the following operations in the wireless device:

1. Decode PDCCH at predefined instances in order to identify its P-RNTI ID
2. If P-RNTI is found, look for paging message on the PDSCH.

Data Reception

DL data reception in the wireless device is managed according to the following operations in the wireless device:
1. Decode PDCCH for UE DL scheduling.
2. Decode PDSCH RBs according to PDCCH scheduling.

UL data transmission from the wireless device is managed according to the following operations in the wireless device:

Data Transmission
1. Decode PDCCH for UE UL scheduling.
2. Transmit on scheduled RBs on PUSCH.
3. Receive ACK/NACK on the PHICH for the UL transmission.

Various example embodiments of the above procedure in FIG. 6 will now be described. In some example embodiments, the first set of channels and/or signals may include channels and/or signals that are dedicated to the wireless device, e.g. as exemplified above. Such dedicated channels and/or signals may thus comprise at least one of: a Physical Downlink Control Channel PDCCH carrying data and paging information, a Physical Downlink Shared Channel PDSCH carrying data and paging information, and a Physical Hybrid-ARQ Indicator Channel PHICH carrying feedback information related to reception of uplink transmissions. Another example embodiment may be that the network node 300 determines the boosted transmit power for the dedicated channels and/or signals based on a desired data throughput of the wireless device 302 which may be dependent on which application is used and/or on conditions in a subscription associated with the device 302. For example, if the wireless device 302 desires a great data throughput the boosted transmit power may be set high to enable a high bitrate in the communication, e.g. by allowing use of an advanced Modulation & Coding Scheme MCS which may be sensitive to errors and therefore require high signal quality to achieve reliable reception.

In addition to the dedicated channels and/or signals, the first set of channels and/or signals may in further example embodiments include common channels and/or signals comprising at least one of: a Primary Synchronization Signal PSS, a Secondary Synchronization Signal SSS, Cell-specific Reference Signals CRS, a Physical Broadcast Channel PBCH, a Physical Control Format Indicator Channel PCFICH, a Physical Downlink Control Channel PDCCH carrying system information, and a Physical Downlink Shared Channel PDSCH carrying system information. It should be noted that some CRSs may be included in the first set while other CRSs may be included in the second set, such that the CRSs in the first set will be boosted and the CRSs in the second set will be attenuated.

In some implementations, it may be possible to apply boosted transmit power to one or more of the above common channels and/or signals even before detecting the device 302, to enable any wireless device, so far undetected and unknown to the network node 300, to synchronize to the network node 300 and read various cell and system information broadcasted therefrom. For example, a limited set of central RBs carrying those common channels and/or signals may be regularly transmitted using a predefined boosted transmit power while all remaining RBs are transmitted using a lower transmit power, before the above actions 600-610 are performed.

As indicated above, another example embodiment may be that the network node 300 determines the boosted transmit power individually per channel or signal. This means that different channels and signals may be transmitted with different levels of transmit power. For example, it may be more important for the communication that the wireless device 302 receives certain crucial channels and signals than others, and the crucial channels and signals, e.g. channels and/or signals which are necessary to maintain the communication, may therefore be transmitted with higher power than less needed channels and/or signals.

It was indicated above that the first and second sets of channels and/or signals may be scheduled and transmitted on different radio resources such as resource blocks, subcarriers, RE groups or resource elements. In further example embodiments, the first set of channels and/or signals may at least partly be scheduled on a first set of subcarriers which are transmitted using the boosted transmit power, and the second set of channels and/or signals may at least partly be scheduled on a second set of subcarriers which are transmitted using the attenuated transmit power. In the example of FIG. 5, the boosted RBs are transmitted in the frequency range or interval 500A which corresponds to the above-mentioned first set of subcarriers, while the attenuated RBs are transmitted in the frequency ranges or intervals 500B which corresponds to the above-mentioned second set of subcarriers. In that case, another example embodiment may be that the network node 300 transmits the first set of channels and/or signals at least partly in allocated radio resources of the first set of subcarriers. In another example embodiment, the network node 300 may determine the boosted transmit power individually per subcarrier or per resource block or per resource element, which was also discussed above.

If such differentiated transmission of radio resources is applied for the boosted transmit power, another example embodiment may be that when the network node 300 serves multiple wireless devices 302, 304, the network node 300 schedules the wireless devices in radio resources based on their distance to the network node 300. In this embodiment, a wireless device that is located relatively close to the network node 300 can thus be scheduled in an attenuated radio resource, e.g. a resource block or resource element, while another remote wireless device that is located further away from the network node 300 can be scheduled in a boosted radio resource, to ensure that the remote device is able to receive the channels and/or signals transmitted in the boosted radio resource.

In another example embodiment, transmission parameters used for the transmission of the first and second sets of channels and/or signals may be adapted to the determined boosted transmit power and the determined attenuated transmit power. In some further example embodiments, these transmission parameters may comprise at least one of: a combination of Modulation & Coding Scheme MCS and rank for PDCCH, and a number of Control Channel Elements CCEs for PDCCH.

In another example embodiment, the total transmit power used for transmitting the first and second sets of channels and/or signals on a specific antenna port may not exceed a pre-defined maximum total transmit power per antenna port. In other words, for each antenna port a specific power budget with total available power may be defined which cannot be exceeded.

The above-described procedures and embodiments thereof may be employed depending on the situation. In another example embodiment, the actions 600-610 may be performed after the network node 300 has been replaced or upgraded to employ a new transmission technology which e.g. provides higher bitrate and/or shorter transmission range than a previous transmission technology employed by the network node 300 prior to said replacement or upgrade. In yet another example embodiment, said new transmission technology may be related to modulation and/or coding, e.g. when a more advanced but less robust MCS has been introduced in the network node 300 which may necessitate the boosted transmit power for channels and/or signals to a remote wireless device 302 as described above.

Figure 7:
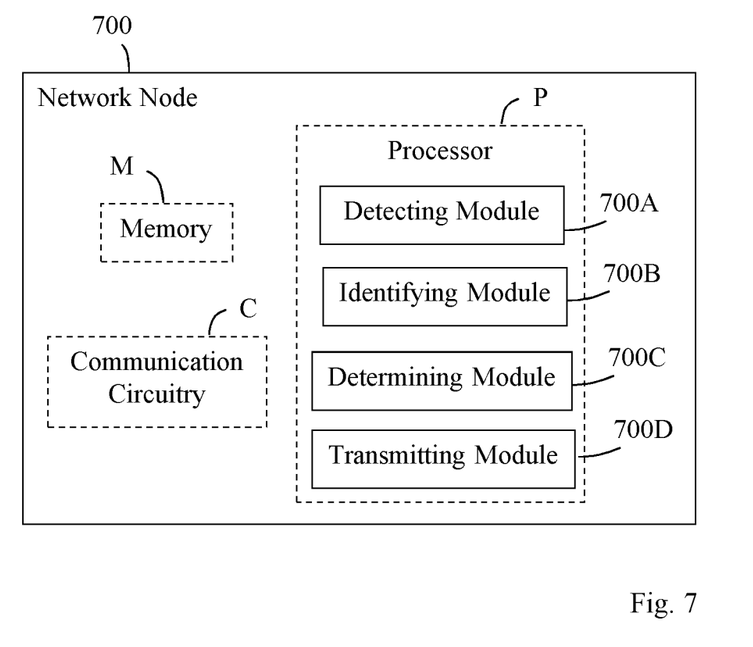
FIG. 7 is a block diagram illustrating how a network node may be configured, according to further possible embodiments.

The block diagram in FIG. 7 illustrates a detailed but non-limiting example of how a network node 700 may be structured to bring about the above-described solution and embodiments thereof. The network node 700 may be configured to operate according to any of the examples and embodiments of employing the solution as described above, where appropriate, and as follows. The network node 700 is shown to comprise a processor P and a memory M, said memory comprising instructions executable by said processor P whereby the network node 700 is operable as described herein. The network node 700 also comprises a communication circuit C with suitable equipment for receiving and transmitting signals in the manner described herein.

The communication circuit C is configured for communication with wireless devices and other network nodes using suitable protocols depending on the implementation. This communication may be performed in a conventional manner over a communication network employing radio links for wireless communication, which is not necessary to describe here as such in any detail. The solution and embodiments herein are thus not limited to using any specific types of networks, technology or protocols for radio communication.

Figure 6:
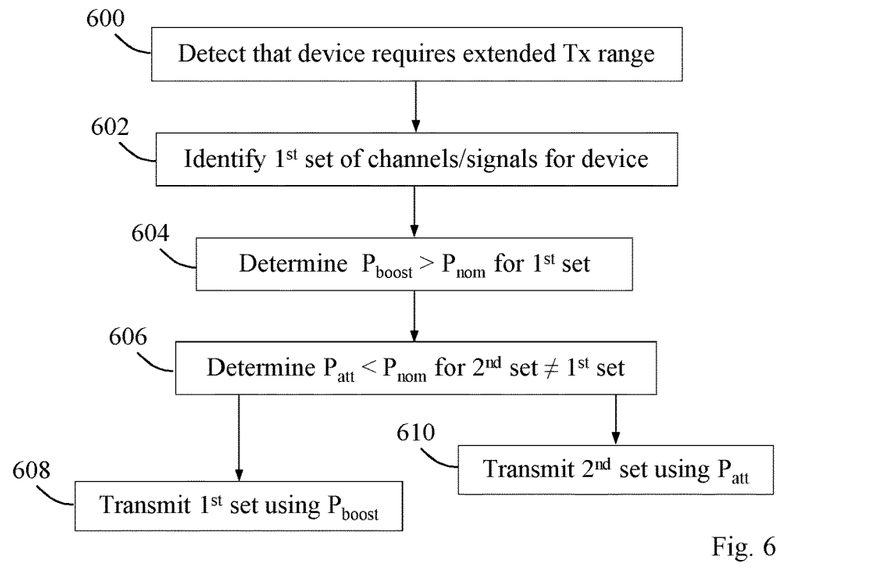
FIG. 6 is a flow chart illustrating a procedure in a network node, according to further possible embodiments.

The network node 700 is operable in a wireless network and comprises means configured or arranged to perform the actions 600-610 in FIG. 6. The network node 700 is arranged or configured to enable wireless communication with a wireless device in the wireless network, wherein a pre-determined maximum total transmit power is available for downlink transmission by the network node 700.

The network node 700 is configured to detect that the wireless device requires an extended transmission range which is larger than a current transmission range provided by the network node 700 when using a nominal transmit power. This operation may be performed by a detecting module 700A in the network node 700, e.g. in the manner described for action 600 above.

The network node 700 is also configured to identify a first set of channels and/or signals to be used for said wireless communication with the wireless device. This operation may be performed by an identifying module 700B in the network node 700, e.g. as described for action 602 above.

The network node 700 is also configured to determine a boosted transmit power for the first set of channels and/or signals required to achieve the extended transmission range, the boosted transmit power being higher than the nominal transmit power. This operation may be performed by a determining module 700C in the network node 700, e.g. as described above for action 604.

The network node 700 is also configured to determine an attenuated transmit power for a second set of channels and/or signals not included in the first set of channels and/or signals, the attenuated transmit power being lower than the nominal transmit power. This operation may be performed by the determining module 700C, e.g. as described above for action 606.

The network node 700 is further configured to transmit the first set of channels and/or signals using the boosted transmit power and the second set of channels and/or signals using the attenuated transmit power, so that the total transmit power used for transmitting said first and second sets does not exceed the pre-determined maximum total transmit power. This operation may be performed by a transmitting module 700D in the network node 700, e.g. as described above for actions 608 and 610, respectively.

It should be noted that FIG. 7 illustrates various functional units in the network node 700, and the skilled person is able to implement these functional units in practice using suitable software and hardware. Thus, the solution is generally not limited to the shown structures of the network node 700, and the functional units 700A-D therein may be configured to operate according to any of the features and embodiments described in this disclosure, where appropriate.

The functional units 700A-D described above can be implemented in the network node 700 by means of suitable hardware and program modules of a computer program comprising code means which, when run by the processor P causes the network node 700 to perform at least some of the above-described actions and procedures.

Figure 7A:
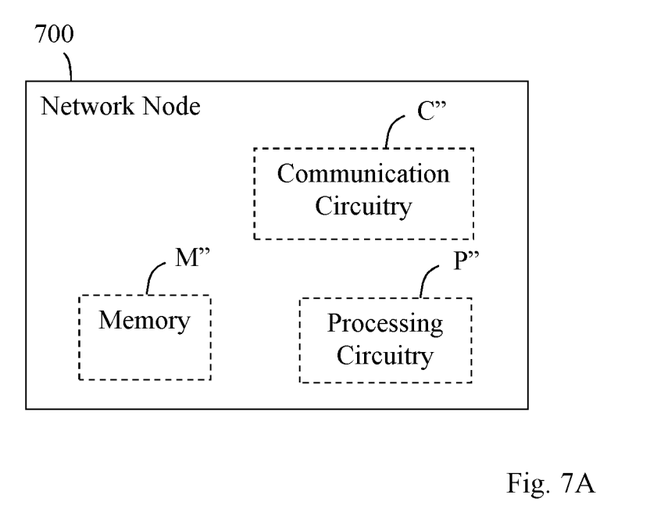
FIG. 7A is a block diagram illustrating another example of how a network node may be configured, according to further possible embodiments

FIG. 7A illustrates another possible alternative of how the network node 700 may be configured with memory M", communication circuitry C" and processing circuitry P". The memory M" comprises instructions executable by said processing circuitry P" whereby the network node 700 is operative as described herein. The communication circuitry C" represents suitable equipment for receiving and sending information in the manner described herein and using a suitable protocol for the described communication depending on the implementation. The solution and embodiments herein are thus not limited to using any specific types of networks, technology or protocols for communication.

In either FIG. 7 or FIG. 7A, the processor P and processing circuitry P", respectively, may comprise a single Central Processing Unit (CPU), or could comprise two or more processing units such as CPUs. For example, the processor P and/or processing circuitry P" may include a general purpose microprocessor, an instruction set processor and/or related chip sets and/or a special purpose microprocessor such as an Application Specific Integrated Circuit (ASIC). The processor P and/or processing circuitry P" may also comprise a storage for caching purposes.

Each computer program may be carried by a computer program product in the network node 700 in the form of a memory having a computer readable medium and being connected to the processor P and/or processing circuitry P". The computer program product or memory in the network node 700 may thus comprise a computer readable medium on which the computer program is stored e.g. in the form of computer program modules or the like. For example, the memory may be a flash memory, a Random-Access Memory (RAM), a Read-Only Memory (ROM), an Electrically Erasable Programmable ROM (EEPROM) or hard drive storage (HDD), and the program modules could in alternative embodiments be distributed on different computer program products in the form of memories within the network node 700.

The solution described herein may be implemented in the network node 700 by means of a computer program product comprising a computer program with computer readable instructions which, when executed on the network node 700, cause the network node 700 to carry out the actions according to any of the above embodiments, where appropriate.

Figure 8:
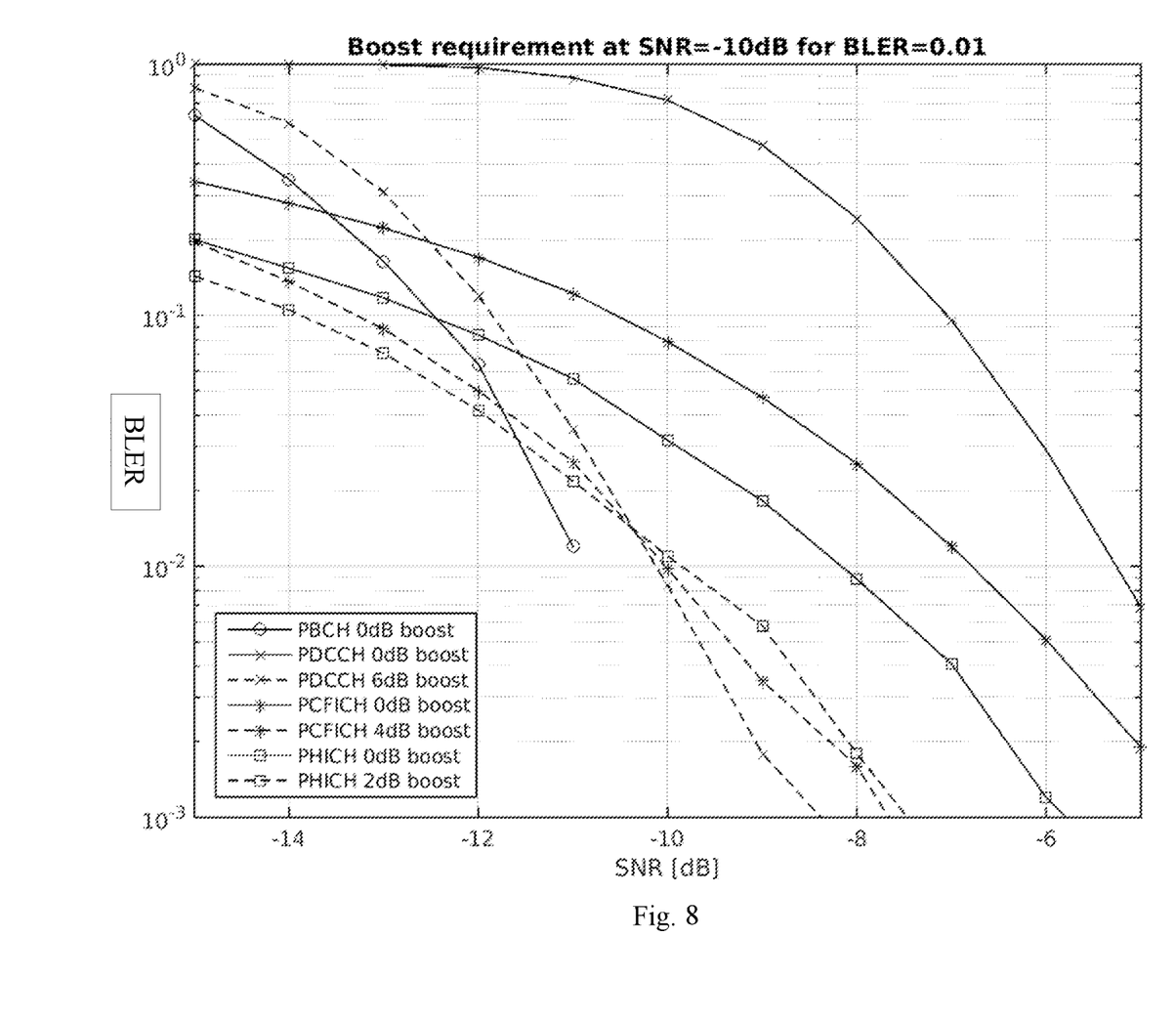
FIG. 8 is a diagram illustrating how performance can be improved for different channels when using different power boost levels, according to further possible embodiments.

It was mentioned above that the boosted transmit power may be determined individually per channel or signal so that different channels and/or signals can be transmitted with different levels of transmit power. FIG. 8 is a diagram illustrating how performance can be improved for different channels when using different power boost levels. In this diagram, it can be deduced that to achieve a Block Error Rate BLER of 0.01 on the control channels PDCCH, PCFICH and PHICH, a Signal-to-Noise Ratio SNR of −10 dB is required which is achieved by applying a 6 dB boost of PDCCH, a 4 dB boost of PCFICH and a 2 dB boost of PHICH, as illustrated by the dashed curves. The solid curves illustrate that a much higher BLER is obtained at SNR=−10 dB when the above control channels are unboosted.

The table below further illustrates which boost levels in dB are necessary to reach BLER=0.01 for different control channels at SNR=−10 dB.

|  | PBCH (BLER: $10^{-2}$) | PHICH (BLER: $10^{-2}$) | PCFICH (BLER: $10^{-2}$) | PDCCH (BLER: $10^{-2}$) | PDSCH$_{MCS\,0}$ (BLER: $10^{-1}$) |
|---|---|---|---|---|---|
| Standard perf. (dB) | −10.9 | −8.1 | −6.8 | −5.2 | −6.6 |
| Boost req. for −10 dB perf. (dB) |  | 2.1 | 3.9 | 5.7 | 4.2 |

Figure 9:
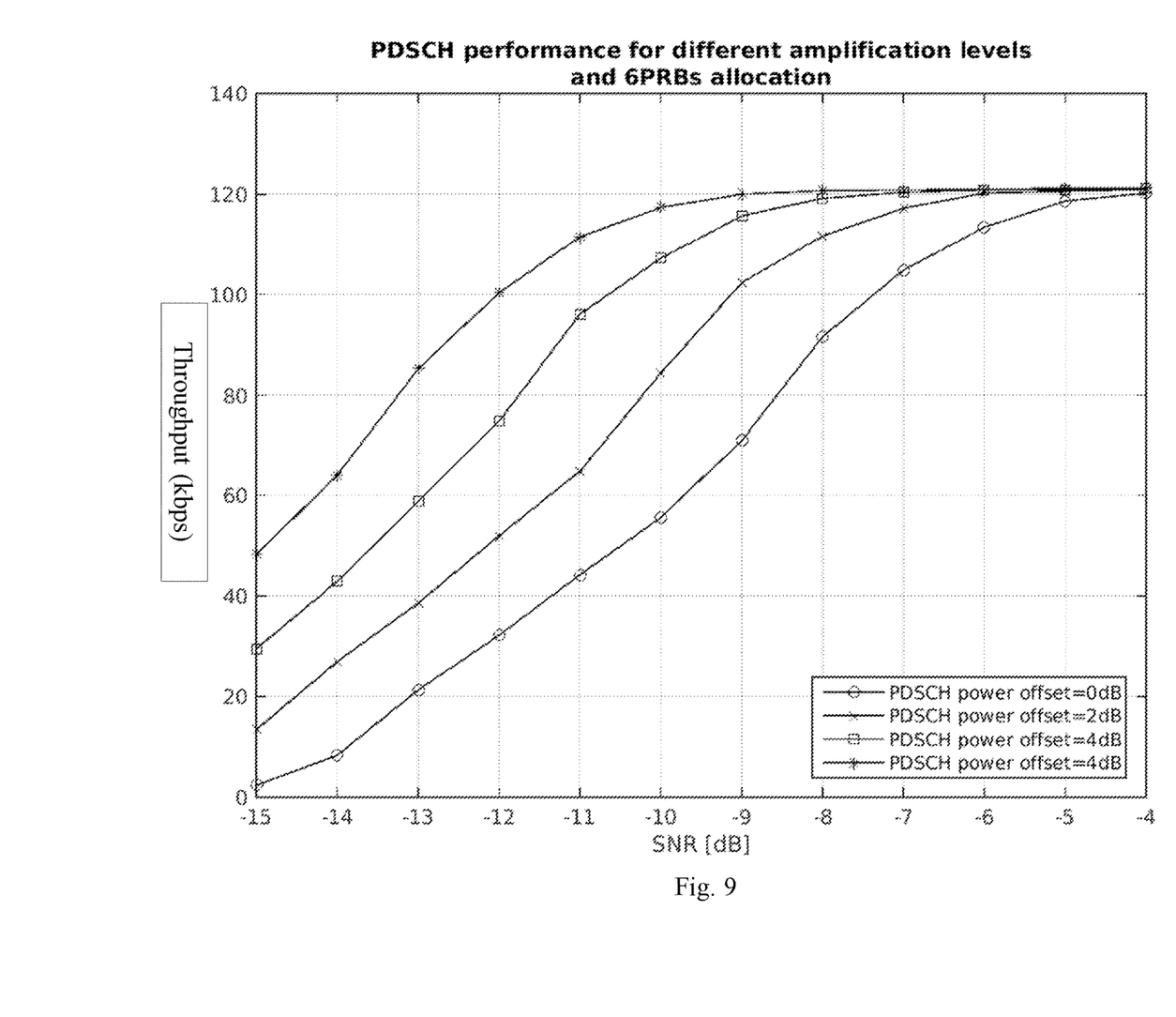
FIG. 9 is another diagram illustrating how throughput of PDSCH can be increased when using different power boost levels, according to further possible embodiments.

FIG. 9 is another diagram illustrating how throughput in kilobits per second (kbps) on the control channel PDSCH can be improved by using different power boost levels on 6 centrally arranged RBs carrying the PDSCH. Assuming 10% BLER for PDSCH, corresponding to slightly more than 4 dB PDSCH boost, the resulting throughput at −10 dB SNR is 107 kbps which roughly corresponds to 7 simultaneous Voice over IP VoIP calls (assuming 300 bit packet sizes and no Discontinuous Transmission DTX). In FIG. 9, ideal control channels are assumed, i.e., PDSCH performance is not depending on PDCCH or PHICH performance.

The above-mentioned synchronization signals and control channels are typically used in an LTE network, which will now be described in more detail.

Synchronization Signals

The PSS is located at the 6 center RBs, and for Frequency Division Duplex FDD and normal Cyclic Prefix CP. FDD and normal CP are used as an as example, but this disclosure is also valid for Time Division Duplex TDD and extended CP. The PSS is normally placed at the last OFDM symbol of the first slot in subframes 0 and 5. It is composed of a 63 length frequency domain Zadoff-Chu sequence with useful synchronization autocorrelation features. Within a radio frame, the PSS port allocation must not change, however, between frames it may change. Hence, so-called inter-frame beamforming may be utilized in order to increase PSS coverage in a certain direction. This may result in a slower synchronization procedure.

Without beamforming, the PSS is robust down to a signal to interference and noise ratio SINR of approximately -6 dB.

For FDD the SSS is located on the symbol prior to the PSS. It is based on maximum length sequences. Each SSS sequence comprises two length 31 BPSK modulated codes that are interleaved in the frequency domain. In a multi-antenna configuration, the SSS must use the same port allocation as PSS. SSS typically also achieves synchronization down to a SINR of −6 dB.

Broadcast and Control Channels

The broadcast channel PBCH is allocated in time domain to the first OFDM symbol of the second slot in a subframe, and in frequency domain to the 6 central RBs out of 72 subcarriers. PBCH utilizes time and antenna diversity as well as forward error correction FEC for robustness. Furthermore, PBCH defines the antenna ports and diversity scheme used for the control channels within a subframe.

LTE's CRS based control channels, PCFICH, PHICH and PDCCH, are provided to support efficient data transmission. They are allocated to the first OFDM symbols which vary between the first one and the first three OFDM symbols. For a bandwidth of 10 RBs or less, the above control channels are allocated to two to four OFDM symbols in each subframe, depending on what is needed. The above three control channels in LTE are all coded with Binary Phase Shift Keying, BPSK or Quadrature Phase Shift Keying, QPSK which allows for transmit diversity by help of space-time block codes STBC when the number of CRS ports is greater than one. In order to further increase robustness, frequency diversity is utilized such that the channels are distributed over the whole frequency spectrum.

The PCFICH, indicating the control channel region size, i.e. 1, 2 or 3 symbols, is coded using a 32 bit codeword. PCFICH is located in 4 Resource Element Groups REGs that are distributed in the frequency domain in the first subframe OFDM symbol. One REG has 4 REs.

The PHICH, carrying ACK/NACK information, is located in the first OFDM symbol in a subframe for normal PHICH duration and in any of the 1, 2 or 3 first OFDM symbols of a subframe for extended PHICH duration. The PHICH is BPSK coded and multiple PHICHes may be overlaid using Walsh spreading codes.

The PDCCH carries the Downlink Control Information DCI including, e.g., PDSCH resource assignment. A PDCCH is transmitted using one or more CCEs allowing for variable PDCCH coding of up to 576 bits, depending on the need of an individual wireless device. The PDCCH content may be divided into common control information for System Information Block SIB, sometimes referred to as SIB-PDCCH, and dedicated control information, sometimes referred to as Data-PDCCH, for downlink data scheduling and uplink grant scheduling for individual active wireless devices.

Physical Downlink Shared Channel, PDSCH

The robustness of the PDSCH is depending on several factors. Firstly, a network node is configured to transmit according to a specific Transmission Mode TM, depending on e.g., number of antennas, Multiple-Input- Multiple-Output MIMO capabilities, device feedback types, etc. Secondly, data to an individual wireless device is modulated and coded according to its present estimated channel conditions. The most robust MCS for data is QPSK modulated data with a code rate below 0.1 corresponding to more than 5 resource elements for every bit of data. The PDSCH content may be divided into SIB-PDSCH, transmitting System Information Block SIB, and Data-PDSCH, transmitting data for active wireless devices.

While the solution has been described with reference to specific exemplifying embodiments, the description is generally only intended to illustrate the inventive concept and should not be taken as limiting the scope of the solution. For example, the terms "network node", "wireless device", "transmission range", "boosted transmit power", "attenuated transmit power", "nominal transmit power", "radio resource", "resource block", and "resource element", have been used throughout this disclosure, although any other corresponding entities, functions, and/or parameters could also be used having the features and characteristics described here. The solution is defined by the appended claims.

The invention claimed is:

1. A network node for enabling wireless communication with a wireless device in a wireless network, wherein a pre-determined maximum total transmit power is available for downlink transmission by the network node, wherein the network node is configured to:
   detect, based on a location of the wireless device, that the wireless device requires an extended transmission range which is larger than a current transmission range provided by the network node when using a nominal transmit power,
   identify a first set of channels or signals to be used for said wireless communication with the wireless device,
   determine a boosted transmit power for the first set of channels or signals required to achieve the extended transmission range, the boosted transmit power being higher than the nominal transmit power,
   determine an attenuated transmit power for transmission of a second set of channels or signals not included in the first set of channels or signals, the attenuated transmit power being lower than the nominal transmit power, and
   transmit the first set of channels or signals using the boosted transmit power and the second set of channels or signals using the attenuated transmit power, where the total transmit power used for transmitting said first and second sets does not exceed the pre-determined maximum total transmit power.

2. the network node according to claim 1, wherein the first set of channels or signals includes channels or signals dedicated to the wireless device and comprising at least one of: a Physical Downlink Control Channel PDCCH carrying data and paging information, a Physical Downlink Shared Channel PDSCH carrying data and paging information, and a Physical Hybrid-ARQ Indicator Channel PHICH.

3. the network node according to claim 2, wherein the network node is configured to determine the boosted transmit power for the dedicated channels or signals based on a desired data throughput of the wireless device.

4. the network node according to claim 2, wherein the first set of channels or signals further includes common channels or signals comprising at least one of: a Primary Synchronization Signal PSS, a Secondary Synchronization Signal SSS, Cell-specific Reference Signals CRS, a Physical Broadcast Channel PBCH, a Physical Control Format Indicator Channel PCFICH, a Physical Downlink Control Channel PDCCH carrying system information, and a Physical Downlink Shared Channel PDSCH carrying system information.

5. the network node according to claim 1, wherein the network node is configured to determine the boosted transmit power individually per channel or signal.

6. the network node according to claim 1, wherein the network node is configured to at least partly schedule the first set of channels or signals in a first set of subcarriers to be transmitted using the boosted transmit power, and to at least partly schedule the second set of channels or signals in a second set of subcarriers to be transmitted using the attenuated transmit power.

7. the network node according to claim 6, wherein the network node is configured to at least partly transmit the first set of channels or signals in allocated resource blocks or resource elements of the first set of subcarriers.

8. the network node according to claim 7, wherein the network node is configured to determine the boosted transmit power individually per subcarrier or per resource block or per resource element.

9. the network node according to claim 7, wherein the network node is configured to serve multiple wireless devices and to schedule the wireless devices in resource blocks or resource elements based on their distance to the network node.

10. the network node according to claim 1, wherein the network node is configured to adapt transmission parameters used for the transmission of the first and second sets of channels or signals to the determined boosted transmit power and the determined attenuated transmit power.

11. the network node according to claim 10, wherein said transmission parameters comprise at least one of: a combination of Modulation & Coding Scheme MCS and rank for PDCCH, and number of Control Channel Elements CCEs for PDCCH.

12. the network node according to claim 1, wherein the total transmit power used for transmitting the first and second sets of channels or signals on a specific antenna port does not exceed a pre-defined maximum total transmit power per antenna port.

13. A method performed by a network node of a wireless network, for enabling wireless communication with a wireless device, wherein a pre-determined maximum total transmit power is available for downlink transmission by the network node, the method comprising:
    detecting, based on a location of the wireless device, that the wireless device requires an extended transmission range which is larger than a current transmission range provided by the network node when using a nominal transmit power,
    identifying a first set of channels or signals to be used for said wireless communication with the wireless device,
    determining a boosted transmit power for the first set of channels or signals required to achieve the extended transmission range, the boosted transmit power being higher than the nominal transmit power,
    determining an attenuated transmit power for transmission of a second set of channels or signals not included in the first set of channels or signals, the attenuated transmit power being lower than the nominal transmit power, and
    transmitting the first set of channels or signals using the boosted transmit power and the second set of channels or signals using the attenuated transmit power, so that where the total transmit power used for transmitting said first and second sets does not exceed the pre-determined maximum total transmit power.

14. the method according to claim 13, wherein the first set of channels or signals includes channels or signals dedicated to the wireless device and comprising at least one of: a Physical Downlink Control Channel PDCCH carrying data and paging information, a Physical Downlink Shared Channel PDSCH carrying data and paging information, and a Physical Hybrid-ARQ Indicator Channel PHICH.

15. the method according to claim 13, wherein the boosted transmit power is determined for the dedicated channels or signals based on a desired data throughput of the wireless device.

16. the method according to claim 13, wherein the first set of channels or signals further includes common channels or signals comprising at least one of: a Primary Synchronization Signal PSS, a Secondary Synchronization Signal SSS, Cell-specific Reference Signals CRS, a Physical Broadcast Channel PBCH, a Physical Control Format Indicator Channel PCFICH, a Physical Downlink Control Channel PDCCH carrying system information, and a Physical Downlink Shared Channel PDSCH carrying system information.

17. the method according to claim 13, wherein the boosted transmit power is determined individually per channel or signal.

18. the method according to claim 13, wherein the method is performed after the network node has been upgraded to employ a new transmission technology which provides higher bitrate and shorter transmission range than a previous transmission technology employed by the network node prior to said upgrade.

19. the method according to claim 13, wherein said new transmission technology is related to modulation or coding.

20. A non-transitory computer-readable storage medium containing a computer program comprising instructions which, when executed on at least one processor of a network node, cause the at least one processor to carry out a method for enabling wireless communication with a wireless device, wherein a pre-determined maximum total transmit power is available for downlink transmission by the network node, the method comprising:
    detecting, based on a location of the wireless device, that the wireless device requires an extended transmission range which is larger than a current transmission range provided by the network node when using a nominal transmit power,
    identifying a first set of channels or signals to be used for said wireless communication with the wireless device,
    determining a boosted transmit power for the first set of channels or signals required to achieve the extended transmission range, the boosted transmit power being higher than the nominal transmit power, determining an attenuated transmit power for transmission of a second set of channels or signals not included in the first set of channels or signals, the attenuated transmit power being lower than the nominal transmit power, and transmitting the first set of channels or signals using the boosted transmit power and the second set of channels or signals using the attenuated transmit power, where the total transmit power used for transmitting said first and second sets does not exceed the pre-determined maximum total transmit power.

* * * * *